(12) United States Patent
Hrovat et al.

(10) Patent No.: US 8,442,735 B2
(45) Date of Patent: May 14, 2013

(54) TRACTION CONTROL SYSTEM AND METHOD

(75) Inventors: Davor Hrovat, Ann Arbor, MI (US); Michael Fodor, Dearborn, MI (US); Mitch McConnell, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1758 days.

(21) Appl. No.: 11/154,726

(22) Filed: Jun. 15, 2005

(65) Prior Publication Data

US 2006/0293841 A1 Dec. 28, 2006

(51) Int. Cl.
*G06F 7/70* (2006.01)

(52) U.S. Cl.
USPC .......... 701/70; 701/25; 701/23; 701/80; 701/71; 340/988; 340/905; 340/602; 340/580; 340/901; 180/197; 180/116

(58) Field of Classification Search .......... 701/23, 701/25, 35, 70, 71, 80, 205
See application file for complete search history.

(56) References Cited

U.S. PATENT DOCUMENTS

| | | | | |
|---|---|---|---|---|
| 5,074,267 A * | 12/1991 | Ironside et al. | | 123/399 |
| 5,265,693 A | 11/1993 | Rees et al. | | |
| 5,459,661 A | 10/1995 | Yagi et al. | | |
| 5,521,825 A * | 5/1996 | Unuvar et al. | | 701/36 |
| 5,732,380 A * | 3/1998 | Iwata | | 701/85 |
| 5,735,362 A | 4/1998 | Hrovat et al. | | |
| 6,473,609 B1 * | 6/2003 | Nakao et al. | | 701/80 |
| 6,577,943 B2 * | 6/2003 | Nakao et al. | | 701/80 |
| 6,650,252 B2 * | 11/2003 | Miller, Jr. | | 340/989 |
| 6,689,015 B2 | 2/2004 | Schmitt et al. | | |
| 2007/0145819 A1 * | 6/2007 | Lin et al. | | 303/146 |

* cited by examiner

*Primary Examiner* — Redhwan k Mawari
(74) *Attorney, Agent, or Firm* — Julia Voutyras; Alleman Hall McCoy Russell & Tuttle LLP

(57) ABSTRACT

In one example, a first vehicle traveling on a road is provided. The vehicle comprises a communication device coupled in the first vehicle configured to receive information transmitted by a second vehicle traveling on the road, the information identifying road surface conditions experience by the second vehicle; and a controller configured to adjust a vehicle operating parameter of the first vehicle in response to receiving the transmitted information from the second vehicle.

20 Claims, 7 Drawing Sheets

TRACTION CONTROL SYSTEM AND METHOD

BACKGROUND AND SUMMARY

Advanced vehicle communication approaches have been used to develop "platooned" vehicle groups, where a group of vehicles travels in a platoon on the highway under automatic control. Such vehicles utilize communication between the vehicles, where there is typically a lead vehicle that transmits its speed, acceleration, desired traveling distance between vehicles, and other data to the other vehicles in the platoon. The trailing vehicles use this information, along with other measured data, to maintain the platoon under desired conditions. Such platoons attempt to increase highway throughput by utilizing automatic control.

However, the inventors herein have recognized a disadvantage with such an approach. For example, platooned vehicles may require significant regulation, and thus, the rate of implementation may be rather low. However, the inventors herein have also recognized that communication from one vehicle to another under less stringent requirements may be readily used with the given state of technology, and in particular, road surface information that may be used in traction control vehicles may be particularly useful to other vehicles.

In one example, a first vehicle traveling on a road may comprise: a communication device coupled in the first vehicle configured to receive information transmitted by a second vehicle traveling on the road, said information identifying road surface conditions experience by said second vehicle; and a controller configured to adjust a vehicle operating parameter of the first vehicle in response to receiving said transmitted information from said second vehicle.

In this way, for example, it is possible to utilize the information to improve vehicle performance on variable friction surfaces, without having to first identify the variation in friction.

DETAILED DESCRIPTION

Traction control systems may be used to adjust powertrain output to improve vehicle operation in situations that may result in reduced traction between a vehicle's wheel and the road. As noted above, a non-moving vehicle situation can be especially challenging where even limiting powertrain output and controlling wheel slip may not result in any significant movement of the vehicle. The following disclosure addresses such a situation, as well as others.

Figure 1:
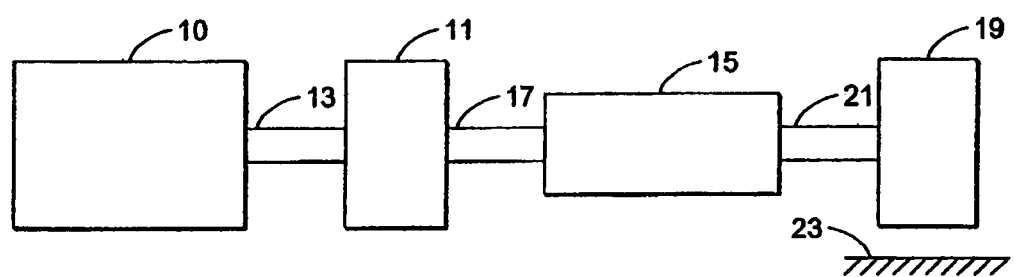
FIGS. 1-2 are block diagrams of a vehicle powertrain and an engine.
Figure 2:
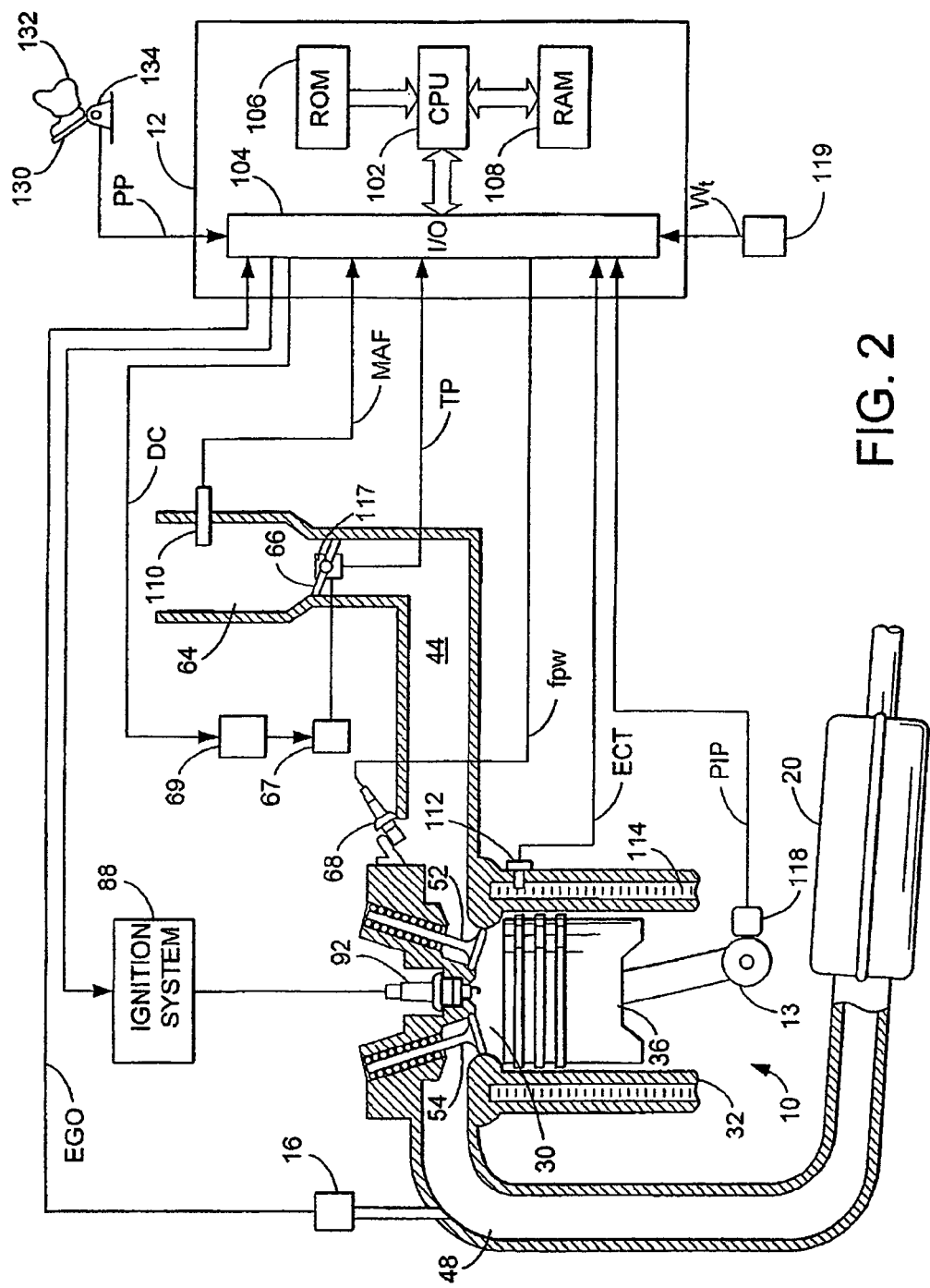

Referring to FIG. 1 an example powertrain of a vehicle is shown. Specifically, internal combustion engine 10, further described herein with particular reference to FIG. 2, is shown coupled to torque converter 11 via crankshaft 13. Torque converter 11 may also coupled to transmission 15 via transmission input shaft 17. Torque converter 11 may have a bypass clutch, which can be engaged, disengaged, or partially engaged. When the clutch is either disengaged or partially engaged, the torque converter is said to be in an unlocked state. While this example shows an automatic transmission with a torque converter, a manual transmission may also be used, or no torque converter may be used.

Transmission 15 may comprise an electronically controlled transmission with a plurality of selectable discrete gear ratios. Transmission 15 may also comprise various other gears such as, for example, a final drive ratio (not shown). Transmission 15 is also coupled to tire 19 via axle 21. Tire 19 interfaces the vehicle (not shown) to the road 23. In one embodiment, transmission 15 has the following driver selectable options: park (P), reverse (R), neutral (N), drive (D), and low (L). The driver selects these positions via a transmission lever.

Internal combustion engine 10 comprises a plurality of cylinders, one cylinder of which is shown in FIG. 2. Electronic engine controller 12 may be used to control engine 10, and optionally transmission 15, if desired. Alternatively, a separate transmission controller may be used. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown).

Engine 10 further includes distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

While the above engine and powertrain are one example that may be used, various other powertrains may be used. In particular, the systems and methods described herein may be used in any wheeled vehicles with a torque-producing powertrain in which traction may be an issue.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17; and a profile ignition pickup signal (PIP) from Hall effect sensor 118 coupled to crankshaft 13 indicating and engine speed (N).

Continuing with FIG. 2, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 66. In this alternative embodiment, the air bypass valve (not shown) receives a control signal (not shown) from controller 12.

While FIG. 2 shows a spark ignition engine, a compression ignition engine may also be used. Further, while valves 52 and 54 are cam driven in one example, they may also be electrically actuated valves, or hydraulically deactivatable valves. Further, while FIG. 2 shows a port fuel injected engine with injector 68 in an intake port, alternative engines may be used, such as a directly injected engine where injector 68 is coupled to inject fuel directly into combustion chamber 30. Further, other powertrain systems may be used, such as hybrid electric, diesel, fuel cell, or others.

Figure 3:
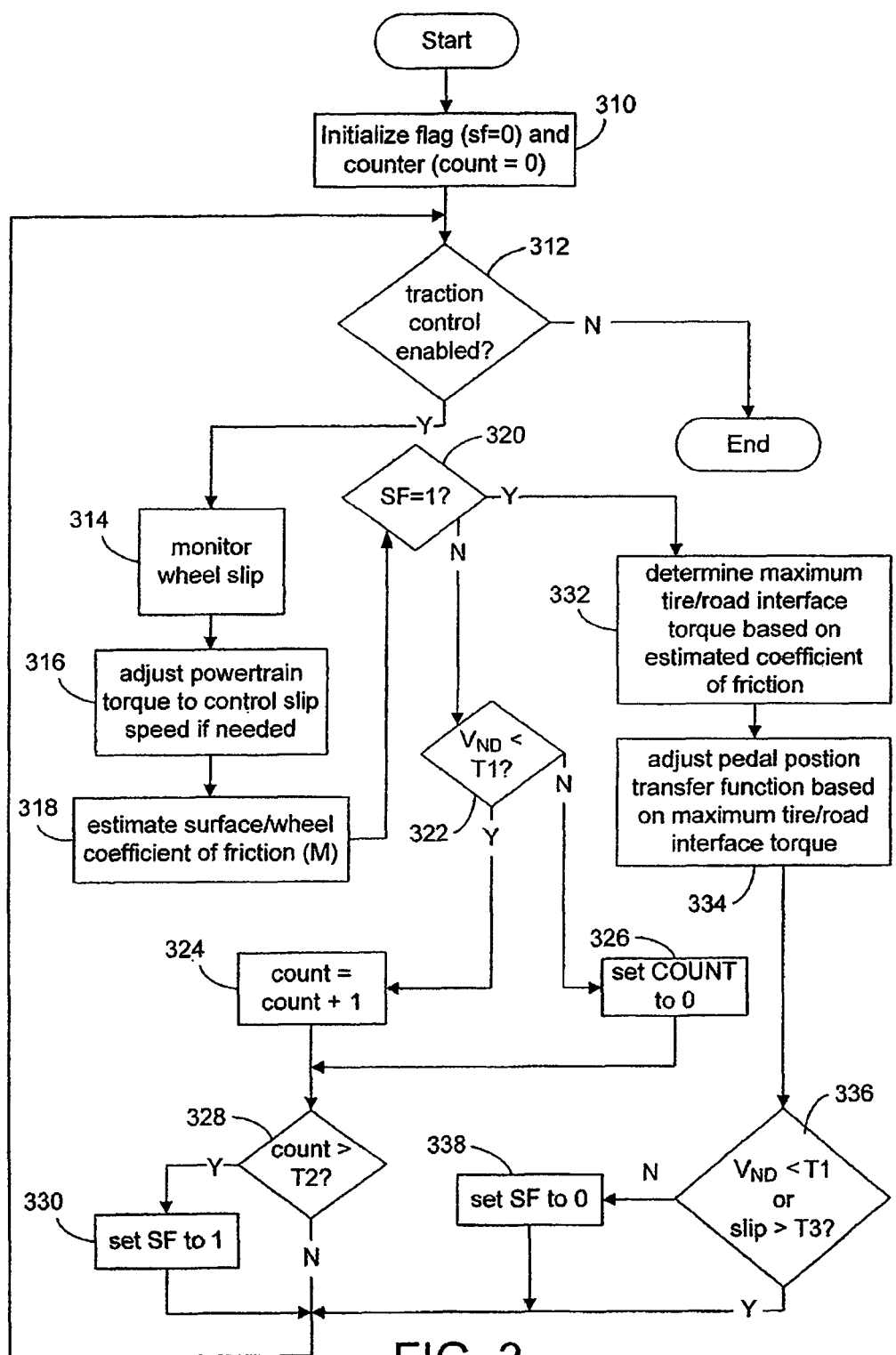
FIG. 3 is a high-level flow chart of various operations.
Figure 4:
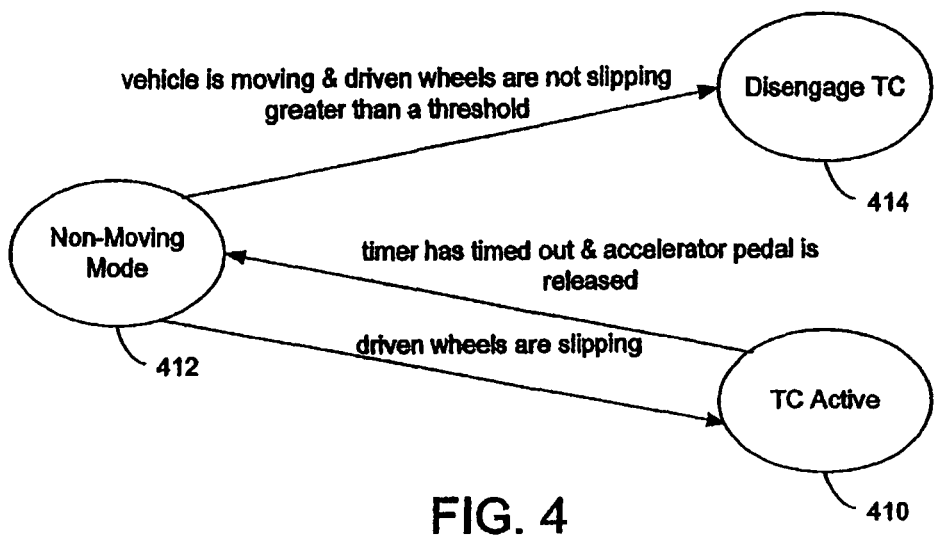
FIG. 4 is a high-level state transition diagram of various operations.

Referring now to FIGS. 3-4, example routines are described for performing traction control with different modes depending on a condition of the vehicle, for example. Specifically, in FIG. 3, a routine is described for detecting a non-moving vehicle condition during traction control operation, and then returning control to the driver with limited powertrain output torque (and higher resolution) by modifying a relationship between pedal position and requested output, such as engine torque.

Referring now to FIG. 3, in step 310 the routine initializes various flags and counters, including initializing flag (SF) and counter (COUNT) to zero. Then, the routine continues to step 312. In step 312, the routine determines whether traction control is enabled. If the answer to step 312 is no, the routine ends. If the answer to step 312 is yes, the routine continues to step 314. Note that various parameters may be used to enable traction control such as for example: a driver actuated button on a dash panel, measured vehicle wheel slip by driven wheels being greater than a threshold value, combinations thereof or various others.

In step 314, the routine monitors the wheel slip of the driven wheels. This can be determined by comparing the measured speed of driven wheels as compared to non-driven wheels. Then, in step 316, the routine adjusts powertrain torque to control the slip speed. For example, engine torque requested by the driver (via the pedal) may be adjusted or reduced by retarding ignition timing, closing an electronically controlled throttle plate, adjusting variable valve and/or cam timing, adjusting electrically actuated valve timing and/or lift, adjusting a transmission gear ratio, adjusting a transmission clutch, adjusting a torque converter clutch, combinations thereof, or various others. In this way, traction control overrides a driver's torque request to reduce and/or control wheel slip and improve traction. However, as described herein, such actions may not always be entirely successful in moving the vehicle. Note that while these are exemplary traction control systems, any other types of traction control system may be used.

Next, in step 318, the routine estimates the surface/wheel coefficient of friction ($\mu$). In one example, this can be estimated based on an estimated powertrain torque being transmitted by the wheels and the measured slip speed. Specifically, an estimated torque (Trq_est), which may be calculated as an engine torque, may be calculated based on an estimate of the wheel torque, reflected upstream through the driveline, transmission and torque converter, taking into account dynamics effects of various inertias and other elements, as appropriate.

Note also that adaptive routines may also be used that adaptively learn the estimated surface/wheel coefficient of friction. Still further, other parameters may also be used to adjust the estimate of the coefficient or friction, such as temperature, vehicle weight and various others.

Next, in step 320, the routine determines whether the flag (SF) is currently set to 1. When the flag SF is set to 1, this indicates that a substantially non-moving condition has been identified. When the answer to step 320 is yes, the routine continues to step 332. Alternatively, when the answer to step 320 is no, the routine continues to step 322.

In step 322, the routine determines whether the velocity of the non-driven ($V_{ND}$) is less than a first threshold (T1). If so, this indicates that the vehicle is still in a substantially non-moving mode, and the routine continues to step 324 to increment the counter (COUNT). In one approach, a substantially non-moving vehicle condition may be detected via wheel speed sensors on driven and/or non-driven wheels. In an alternative embodiment, directional wheel speed sensors may be used, which could determine if vehicle is rolling back, for example. In still another example, any other method for determining if the vehicle is stuck may be used, such as a GPS system, an accelerometer, or combinations thereof.

Returning to steps 324, in one approach, the counter is incremented by a delta time (e.g., $\Delta t$) so that the counter variable is representative of a time that the vehicle has been in a nonmoving condition. Note that when setting the threshold for such a timer, the routine may distinguish the value of the threshold depending on the initial condition (e.g. depending on whether the vehicle was slowing down, originally stopped, etc.).

Alternatively, the counter can be incremented by 1 as shown in step 324 of FIG. 3, and be representative of engine revolutions, sample events, or others. Alternatively, when the step 322 is no, the routine continues to step 326 to reset the flag (SF) to zero indicating that the vehicle is no longer in a non-moving condition.

From either steps 324 or 326, the routine continues to step 328 to compare the counter value (COUNT) to a second threshold (T2). When the answer to step 328 is yes indicating that the counter is above the threshold, the routine continues to step 330 to set the flag (SF) to one. From step 330, or a no from step 328, the routine continues back to step 312. In this way, the routine first attempts to provide traction control operation where wheel slip is controlled and monitors whether this condition exists for greater than a predetermined amount, such as for a predetermined amount of time. Then, if such operation is not successful in moving the vehicle, primary control is returned to the driver's pedal actuation, albeit with a modified relationship as shown below.

Returning to step 332, the routine determines a maximum tire/road interface torque based on the estimated coefficient of friction. Next, in step 334, the routine adjusts the pedal position transfer function based on the determined tire/road interface torque using a factor k. In one example, the scaling value k may be chosen close to one (e.g., 1, or 1.1), and it may be calibrated to correspond to desired vehicle behavior.

From step 334, the routine continues to step 336 to determine whether the non-driven velocity is less than the first threshold (T1). If not, the routine continues to step 338 to set the flag (SF) to zero. Alternatively, when the answer to step 336 is yes, the routine continues to return to step 312.

Returning to step 334, several additional details are described. As noted above, during non-traction control operation, a relationship is used to relate driver actuated pedal operation to a desired vehicle, or powertrain, response (e.g., torque). If a non-moving condition is identified during traction control operation, this relationship may be adjusted based on the traction control operation, as noted above.

Figure 5A:
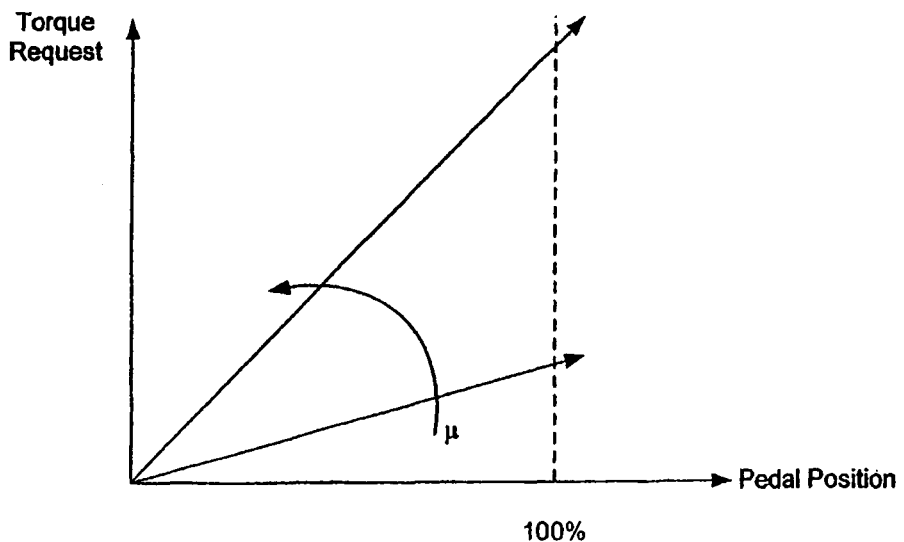
FIGS. 5A-B are graphs illustrating example relationships between pedal actuation and torque.
Figure 5B:
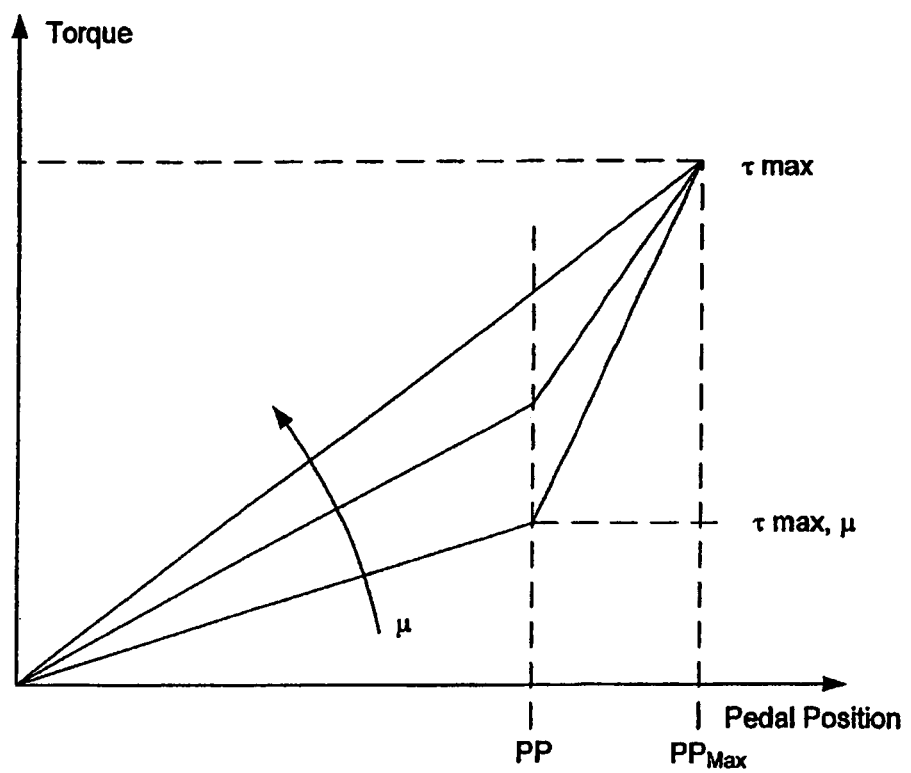

In one approach, pedal position is used to determine a desired wheel torque, desired vehicle acceleration, desired engine torque, desired transmission torque, combinations thereof, or others, for example. One example relationship between pedal position and vehicle response may be defined as shown in FIGS. 5A or 5B. Specifically, FIG. 5A shows an example relationship between pedal position and a request torque. Further, FIG. 5A shows how this relationship may be adjusted, or scaled, based on the estimated friction determined during a previous condition where wheel slip occurred. While FIG. 5A shows an example linear relationship between pedal position and the output request, various others may be used, and may be adjusted based on numerous other conditions as well. For example, FIG. 5B shows another alternative where a nonlinear functional relationship between torque and pedal position is used. Here, up to pedal position PP, a variable gain is used as noted above, from PP to PPmax a more aggressive slope is used up to a maximum possible torque. In this way, the driver can always eventually override the system by applying greater pedal positions.

Thus, before traction control is enabled, the driver operates the vehicle with a first relationship between pedal position and vehicle response, such as torque. Then, when slip is detected, traction control attempts to control slip by reducing engine and/or powertrain torque, and improve the ability of the vehicle to move. However, in some conditions, the vehicle may remain substantially non-moving, or stuck. In this case, vehicle control (e.g., powertrain torque) may be returned to the driver's pedal position, but with a modified, or scaled, relationship so that finer resolution at low output values may be obtained. In this way, the operator may better navigate the stuck condition, with reduced traction control intervention (although such intervention may still occur, if desired).

Elements of the routine may also be illustrated by the state transition diagram of FIG. 4, which shows three states (410, 412, and 414). Specifically, state 410 represents a traction control active state where powertrain output is actively adjusted or limited to control slip to be at or below a threshold value, somewhat unrelated to the driver's actuation of the pedal. However, if this operation continues for greater than a threshold duration (e.g., longer than an amount of time) and the vehicle is substantially non-moving, the state transitions to state 412 (a non-moving vehicle state). Note also that other conditions may be used to transition from state 410 to 412, such as whether the driver releases the accelerator pedal.

In state 412, the powertrain output is returned to being proportional with the pedal actuation by a driver, however it may be scaled based on an estimated coefficient of friction, as describe herein. While in state 412, if the driven wheels again slip greater than a threshold amount, the state returns to state 410 where traction control again tries to reduce powertrain torque output to control slip. Alternatively, if the vehicle starts moving and the slip of the driven wheels falls below a threshold value (e.g., T1), then the state transitions to state 414. State 414 disengages traction control and returns the pedal position to torque request relationship to provide the full powertrain torque availability. In one example, the disengagement and return to full torque availability may be performed gradually.

In this way, it may be possible to improve traction control effectiveness in non-moving vehicle situations, for example.

Thus, in one approach, the gain between the gas pedal position and net powertrain (e.g., engine) torque may be effectively changed (e.g., lowered) during a non-moving vehicle condition. This may further be done as a function of road friction conditions represented by coefficient μ as shown in more detail with regard to FIG. 5. As noted above, adjusting the relationship between pedal position and powertrain output torque in certain situations may be triggered by first detecting that the vehicle is (substantially) not moving within a predetermined, calibratable time. In the case of a valid trigger, the maximum possible tire/road interface torque (Trq_est) may then be estimated from the first (or a previous) wheel spin. A scaled version of the torque (Trq_est) may then be used as the maximum allowed (engine) torque request (Trq_max) corresponding to the full 100% gas pedal position, i.e., Trq_max may be set to k * Trq_est.

Another result of the above proposed approach is that one may obtain finer gas pedal resolution and overall "feel" for the slippery road, where the gas pedal stroke may be effectively adopted to best suit the existing, slippery road conditions. In one example, the net effect is that the driver may have improved drive feel while at the same time producing maximum practical tractive forces that the given tire/road interface can sustain (and thus reducing the need for intervention by the traction control system).

Example expected results using such an approach on a vehicle during the winter are shown in FIG. 6. This plot shows predicted data for a vehicle that is "stuck" on a 6-10% grade snow/ice covered hill. As shown by the data in FIG. 6, in various situations, after enabling at least portions of the above routines, the vehicle was able to move.

Figure 6A:
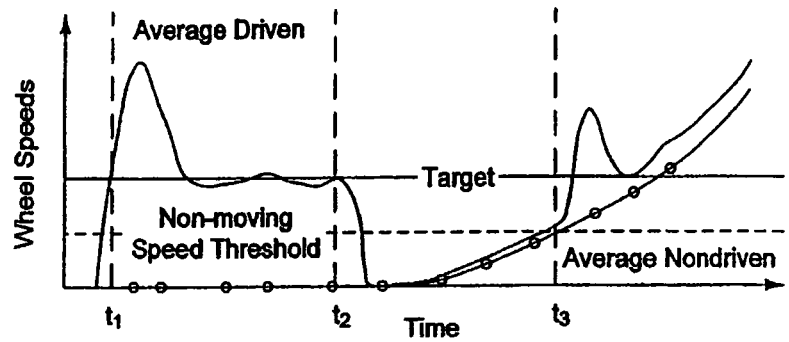
FIGS. 6A-C shows example predicted system response.
Figure 6B:
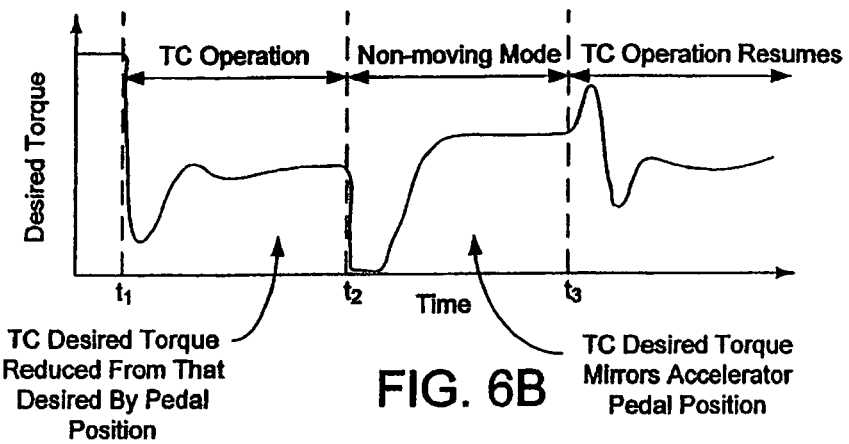
Figure 6C:
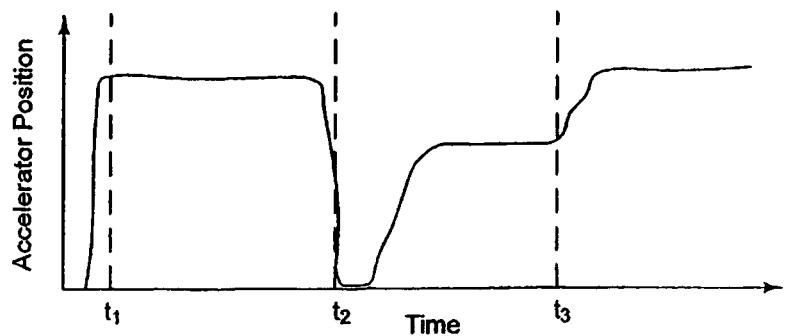

Specifically, FIGS. 6A-C shows wheel speeds, desired torque, and pedal position, respectively, over time. Before time t1, the driver actuates the pedal 134, which causes a corresponding increase in desired torque. The powertrain responds to initially provide this torque, which causes wheel slip to occur. As shown by the solid line of FIG. 6A, the driven wheel speed increases, but the non-driven wheel speed (line with dots) remains substantially zero. At time t1, traction control engages to reduce desired torque (even though the driver is still actuating the pedal 134) to control slip to the target value. However, even with such slip control, the vehicle speed (via the non-driven wheels) remains substantially zero. After a duration and after the operator releases pedal 134, at time t2 the controller operates the vehicle in another mode where the driver is again provided direct control, yet with a smaller range of authority. At this time, the driver actuates the pedal, without active slip control, but with a reduced gain, to obtain vehicle movement. However, since this limited gain control is not useful for many conditions outside of the present non-moving slip condition, at time t3 the controller again transitions to operate in slip control. In this way, improved vehicle operation may be obtained.

Note that while the above disclosure provides various example approaches that may be used, various other modifications, additions, or deletions may be made. For example, it is possible to further constrain the application of the above controls, by requiring that the non-moving condition mode be identified only if, in addition to the above vehicle immobile timing requirements, the brake also be applied (e.g., a brake on/off signal is activated). This may secure that the next gas pedal application will start from a stationary wheel position (zero slip), which can often lead to larger torques before actually spinning the wheels. In other words, in many cases, there is a torque peaking just before "breaking loose"—similar to the force peaking just before breaking a sticktion in stick-slip situations).

As another example, the disclosed approach may be used with both an electronic throttle system or non-electronic throttle system (e.g., by reducing engine torque via spark and fuel, for example). Further, other approaches to torque reduction may be used, such as a cable stretcher, air/fuel ratio control, and other methods for other types of powertrains, or combinations thereof.

As still another example, the driver pedal relation could be further refined and extended by combining the above approach with the automatic transmission upshifting, which is often used to further reduce the wheel torque.

As yet another example, the above pedal sensitivity adaptation may be combined with a multi-position switch/knob (e.g. 4 positions, indicating "dry road", "wet road", "snow", and "ice"). The driver could then chose an appropriate position depending on current road conditions—e.g. snowy road, and this would change the gas pedal sensitivity to a prescribed setting, typical of the current knob setting. While a knob or switch in the driver's cockpit area may be one example, various other types of input device may be used, such as, for example, voice recognition, satellite weather and/or road information, weather sensors (e.g., a rain sensor), combinations thereof, or others.

Operation could be further refined by identifying the correct maximum road torque for the current conditions, after the driver causes the first spin (where an owners manual may explain to the driver that to fully utilize this function, he or she should first cause the "probing" spin with an appropriate tip-in, before switching to a low friction setting). This feature may be especially useful when driver identifies that he is on a continuous (e.g. ice) surface, such as an ice hill. The appropriately reduced pedal-to-torque transfer function may then give improved control and an improved chance of climbing the hill.

Note that in one example described above, the first wheel spin on a slippery surfaces is used to quickly identify the maximum coefficient of friction that the surface can accommodate (i.e. the maximum force) and then to limit the maximum wheel torque (i.e. throttle opening, spark, fuel and similar) to a portion of this maximum torque. While this may facilitate better usage of the pre-spin tire torque capabilities, the constraint may be eliminated as soon as the vehicle starts to move, (which may be detected via non-driven wheel speeds or appropriate estimates). Thus, in an alternative embodiment, it may be possible to extend the friction estimation on uniform low μ surfaces, which can extend for longer distances (e.g. long, uniform snow covered hills and similar). For example, in one example, an extra knob or switch (position) marked "Hill Climb" or "W" for "Winter' and similar could be used to enable the friction estimation. When depressed, the gas pedal could be automatically adapted to the prevailing road conditions, giving the driver the best foot control upon the existing road conditions. If these conditions change gradually, the system could adapt due to extra torque capabilities, which also increase as the estimated μ increases. Alternatively, the driver could reset the knob, for example if the road friction increases substantially, e.g. if it is clear that the road changed to essentially high μ (e.g. 0.9) surface such as dry asphalt or similar.

Alternatively, or in addition to a separate knob, the limiting of vehicle speed increase could be performed automatically for operations on hills and for operations in reverse. In this way, the "hill climb" mode can be in effect for longer periods on slippery hills. In the case of reverse operations, the above mode may stay on for longer periods, so that an operator could back the vehicle down hill in preparation for building the momentum for the next try of negotiating the up hill slope. Furthermore, the approach could be further refined by using "time-in-the-hill-mode" as an additional limiting variable, in addition to the limiting speed. Thus, on slippery hills, one could increase both (a timer as well as the limiting speed), as the slope increases. An example below describes a simplified example depending on the limiting speed alone, where this speed increases with the estimated hill slope.

In one example, reverse operations may be identified via a shift lever (e.g., sometimes referred to as PRNDL) or a manual shifter positions (e.g. the same one that operates reverse lights), or appropriate direction-sensitive wheel speed signals, for example. The hill grade may be identified in various ways, several of which are described in detail below.

One example approach to estimate grade uses a level sensor with appropriate (e.g. low pass) filtering may be used to estimate prevailing hill conditions. Alternatively, or in addition to this, one could estimate the road grade using different vehicle models.

One vehicle model based approach uses the following equation for the two driven wheel forces F:

$$F = m*acc - m*g*\sin\alpha = \frac{\tau_w}{r} \qquad (1)$$

Where m and acc are vehicle mass and longitudinal acceleration, α is the grade angle, $\tau_w$ is the wheel torque on both driven wheels, and r is the effective/loaded wheel radius (this equation could be further refined by including the rolling and air/wind resistance). In this equation, vehicle acceleration may be measured via non-driven wheel speeds (for 2WD vehicles), wheel radius is known a priori and may be adjusted or adapted as a function of vehicle mass estimates, wheel torque may be estimated from powertrain models discussed below. Vehicle mass and hill slope (or grade) are then the targets of on-line estimation.

In one example, if the vehicle has an advanced suspension with direct measurement of suspension deflection, such measurements may be used as an indicator of vehicle weight or mass. Further, tire pressure may also be used as an indication of vehicle weight. In another example, fuel level may be used (alone or in combination with other approaches described herein) as an indicator of grade/slope, with or without additional filtering and processing. Alternatively, or in addition, the following method of discerning the estimates of vehicle mass vs. the simultaneous estimate of the slope may be used. The estimation could be done in a number of ways (e.g. Recursive Least Squares, adaptive control/estimation type approach, Extended Kalman Filter—EKF, neural nets etc.).

First, in one approach, a low pass filter- (or averaging-) type of schemes of significantly different time constants (than the time constant of actual changes in road grade) may be used, along with some additional logic to facilitate making this distinction. For example, the low pass filter for the mass estimate may have a larger time constant than the one for filtering rapid slope changes. One example case uses averaging of the above equation during a prolonged time period (e.g. 10-60 minutes) to estimate the mass so that the contribution from slope/grade diminishes and the average tends to the true mass value.

Once the mass estimate converges (e.g., stays within some small ϵ), the mass estimate could then be set to this number during the rest of the drive, (e.g., until next stop). For example, in some examples, it may be assumed that the mass does not change substantially during the drive. Furthermore, in some examples, it may be assumed that during any stops with the engine running, the slope determined thus far does not change (i.e. the slope estimate is frozen) so that once the vehicle starts moving, the initial time period corresponding to a preset distance (represented by the calibratable parameter $x_{launch}$ in meters or feet) of vehicle travel can be used for updating the mass using the previously "frozen" slope value. Also, after the stop, it may be possible to re-estimate the slope by placing more emphasis or weight on the last batch of data with a shorter backwards-looking horizon (a focus on the geometrically last set of slope estimates may also come naturally due to the lower vehicle speed as it approaches the stop).

For situations where the vehicle stops with the engine turned off, various approaches may be taken. In some cases, this can imply that the vehicle does not move, but in other cases the vehicle may be transported via train or ferry, or towed away. One approach is to ignore the possibility of a vehicle changing location without its own power. In this case the estimation proceeds just as with the engine running, i.e. assuming that the slope/grade is substantially the same before the engine is turned off as when the engine is restarted. In a second embodiment, initial values for mass and slope may be used from the previous run (stored in KAM), and then immediately upgraded through the above filtering/estimation scheme.

The above approach could be further enhanced and improved by utilizing additional sensory information, such as using pre-stored maps with topographic information along with the GPS (global position system, e.g., satellite information) and barometric pressure, for example. In this case, an estimate of the elevation and an effective "averaged" slope could be obtained and used in the filtered/averaged version of Eq. 1, i.e. the version that is used for vehicle mass estimation. Alternatively, the GPS information and/or (changes in) barometric pressure information may be used exclusively to identify road grade.

Regarding wheel torque measurement and/or estimation, various approaches may be used. For example, wheel torque estimation can be done by combining estimates based on engine and torque converter models, assuming that there is no brake. Engine torque estimate can be based on air charge, fuel charge, temperature, exhaust gas recirculation, ignition timing, and/or various other factors. Likewise, engine torque can also be estimated using torque converter input and output speeds, along with torque converter characteristics. Further, the torque converter model can include factors for clutch application, either full or partial.

In one embodiment, since engine net torque estimates may be more precise at lower frequencies, one could mix a low-pass filtered component of estimated engine torque with a high-pass filtered component of the torque converter based torque, such that the resultant torque sums to approximately unity across the frequency spectrum of interest. One could also use a similar approach of relying on engine torque to tune/adapt/learn the torque converter characteristic curves for operations around a speed ratio (ratio of torque converter input speed to output speed, or vice versa) of approximately unity, where there is a large vehicle-to-vehicle variability.

The above road texture changes could also be discerned via an on board camera—either video or simple digital still camera with repeated picture taking capabilities, e.g. with a frequency of 2 per second. The information from the cameras can then be processed on-board the vehicle for extraction of appropriate patterns. The cameras may be in various locations, such as rear view cameras, side view cameras on side view mirrors, or forward looking cameras. The camera provided information can also be used for preview of road friction ahead of the vehicle, so that appropriate traction control actions can be taken even ahead of any (sudden) friction, or $\mu$, change events. Also, instead of, or in addition to, the ordinary digital cameras, one could also use infrared/laser-based cameras, which can be especially effective in dark areas or during night operations. Finally, the vehicle could also use the information from another vehicle with which it is in communication, or a communication station broadcasting road information for one or more road locations. For example, a lead vehicle may communicate road and/or friction information to vehicles following it, or traveling behind it. The transmitted information can be determined by estimating a road surface friction amount, or change in friction, or various others. The data may be estimated based on wheel speed difference between driver and non-driven wheels, or various other methods, for example.

In the case where one vehicle identifies a specific road condition (e.g., slippery roads), it could emit a "Slippery Ice ahead" warning signal to surrounding vehicle, which can then receive this information and adjust engine, transmission, brake, and/or other operating conditions to compensate for such identified conditions. Also, the vehicle can transmit additional location data, identifying a physical location of the identified road surface conditions. Further still, communication stations or other fixed devices could transmit road surface information about various locations within the vicinity of the station or fixed device. For example, a plurality of stations could be positioned at various locations along roads, with each transmitting relevant road surface information for various locations within the vicinity of the station. Then, this information could be received by the vehicle and used to adjust vehicle operation when in the location identified to have specific conditions, such as slippery roads, ice, variable friction zones, etc. Further, this information could be used to engage and/or disengage traction control operation, or over-riding of the driver request, or overriding of cruise control operation. Finally, the vehicle receiving road information can also store and/or further transmit the information to still other vehicles or stations.

Figure 7:
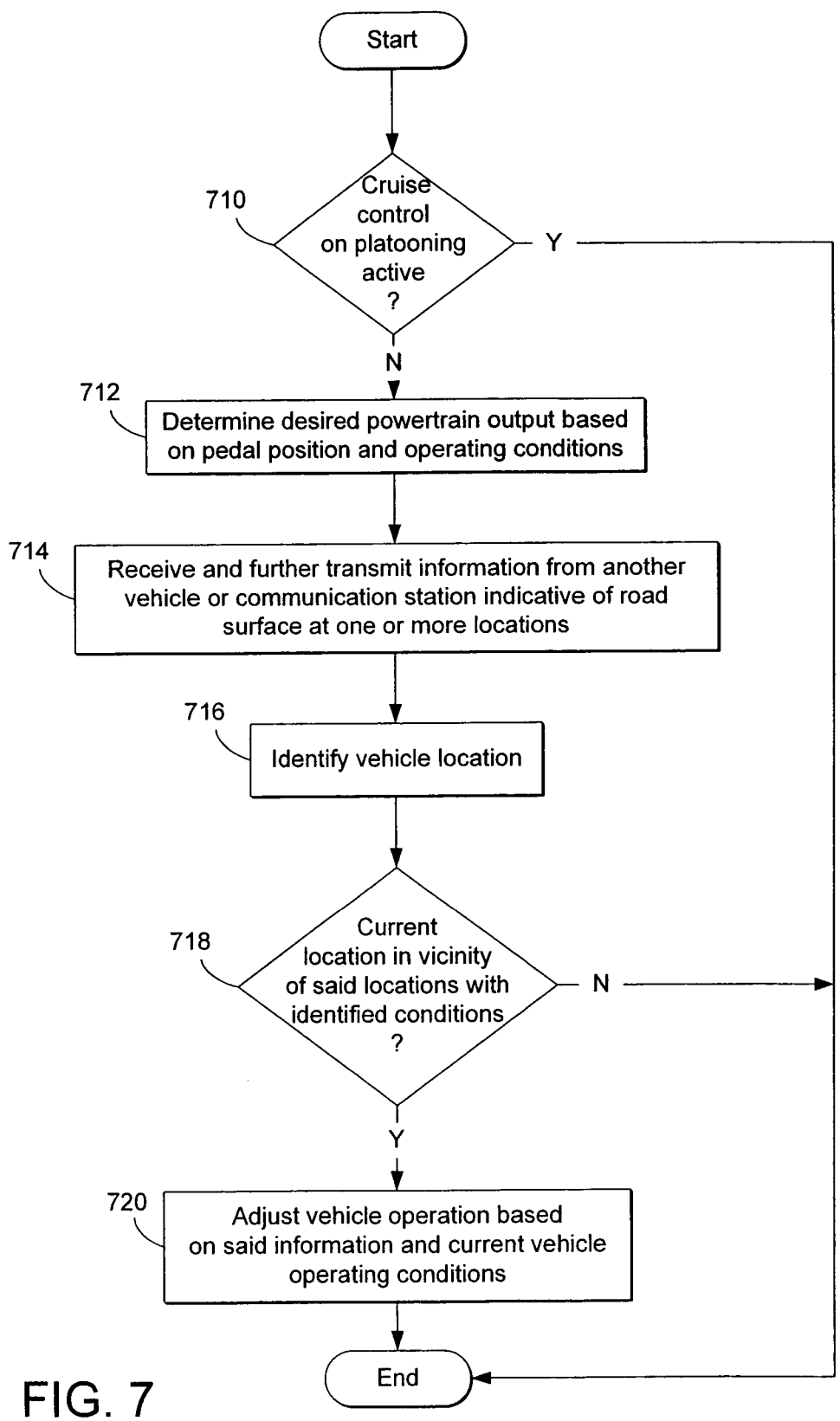
FIG. 7 shows a flow chart of various operations.

Referring now to FIG. 7, an example routine is described showing one example embodiment using transmitted information indicative of road surface conditions, such as road grades, friction values, etc.

First, in step 710, the routine determines whether cruise control or vehicle following operation (also known as adaptive cruise control or platooning operation) is active. If so, the routine ends. If not, the routine continues to step 712 to determine desired powertrain output based on pedal position and operating conditions, such as vehicle speed. Then, in step 714, the routine receives (and further transmits, in some cases) information from another vehicle or communication station. In one example, the information includes data indicative of road surface conditions at one or more locations, where the data includes such location information. Then, in step 716, the routine identifies current vehicle location, or a range of current locations.

Then, in step 718, the routine determines whether the current location is within a vicinity (which can be variable) of the locations identified in the received information. For example, if the vehicle receives road grad and/or surface friction information about a certain location, the routine determines whether the current location is within a pre-selected range from that certain location. If so, the routine continues to step 720 to adjust a vehicle operational parameter (such as wheel torque, torque split among the wheels, desired output torque, desired speed, or combinations or subcombinations thereof) based on the information and current operating conditions. For example, the routine can override a driver requested torque and reduce torque output by a variety of methods, including retarding spark, changing effective gear ratio of a transmission, closing the engine throttle, combinations thereof, or others. Then, the routine ends.

However, in an alternative embodiment, step 710 can be skipped and step 720 can further include disengaging cruise control or other such operation.

In this way, the vehicle can take advantage of the information and improve vehicle operation.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, the wheel slip control may be applied to any powertrain that drives wheels and is controlled by a driver using some input device, such as, for example, electric, hybrid/electric, diesel, diesel hybrid, gasoline hybrid, fuel cell, or others. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. A first vehicle traveling on a road, comprising:
   a communication device coupled in the first vehicle configured to receive information transmitted by a second vehicle traveling on the road, said information identifying road surface conditions experienced by said second vehicle and a location of said road surface conditions;
   a pedal operated by a driver of the first vehicle;
   an electronically controlled throttle positioned based at least on a position of the pedal; and
   a controller for adjusting a powertrain output of the first vehicle in response to actuation of said pedal, and during said adjusting, receiving said transmitted information from said second vehicle, and adjusting a control resolution of a relationship of the pedal position corresponding to the electronically controlled throttle position in response to said received information.

2. The vehicle of claim 1 wherein said controller is further configured to receive information from a satellite, and adjust said powertrain output of the first vehicle in response to said received satellite information.

3. The vehicle of claim 1 wherein said powertrain output of the first vehicle is an engine output.

4. The vehicle of claim 1 wherein said powertrain output of the first vehicle is a wheel torque.

5. The vehicle of claim 1 wherein the relationship of the pedal position corresponding to said powertrain output is a variable gain nonlinear functional relationship and adjusting the control resolution includes adjusting a gain of the pedal position.

6. The vehicle of claim 1 wherein the adjustment of the control resolution includes adjusting the relationship such that a change in pedal position has a finer resolution of control of the electronically controlled throttle position at low values of the powertrain output.

7. The vehicle of claim 1 wherein said received information includes road surface friction data.

8. The vehicle of claim 1 wherein said received information includes road surface type.

9. The vehicle of claim 8 wherein said road surface type includes information relating to at least one of ice, rain, and snow.

10. A first vehicle traveling on a road, comprising:
    a communication device coupled in the first vehicle configured to receive information transmitted by a second vehicle traveling on the road, said information identifying road surface conditions experience by said second vehicle and a location of said road surface conditions;
    a pedal operated by a driver of the first vehicle;
    an electronically controlled throttle positioned based at least on a position of the pedal; and
    a controller for adjusting a powertrain output of the first vehicle in response to actuation of said pedal, and during said adjusting, receiving said transmitted information from said second vehicle, adjusting the powertrain output based on the received information to control vehicle slip, and in response to the adjustment of the powertrain output resulting in a vehicle non-moving condition adjusting a control resolution of a relationship of the pedal position corresponding to the electronically controlled throttle position.

11. The vehicle of claim 10 wherein said controller is further configured to receive information from a satellite, and adjust said powertrain output of the first vehicle in response to said received satellite information.

12. The vehicle of claim 10 wherein said powertrain output of the first vehicle is an engine output.

13. The vehicle of claim 10 wherein said powertrain output of the first vehicle is a wheel torque.

14. The vehicle of claim 10 wherein said received information includes road surface friction data.

15. The vehicle of claim 10 wherein said received information includes road surface type.

16. The vehicle of claim 15 wherein said road surface type includes information relating to at least one of ice, rain, and snow.

17. The vehicle of claim 10 wherein the relationship of the pedal position corresponding to said powertrain output is a variable gain nonlinear functional relationship and adjusting the control resolution includes adjusting a gain of the pedal position.

18. The vehicle of claim 10 wherein the adjustment of the control resolution includes adjusting the relationship such that a change in pedal position has a finer resolution of control of the electronically controlled throttle position at low values of the powertrain output.

19. The vehicle of claim 1 wherein adjusting the control resolution includes setting a gain of powertrain output relative to pedal position in a first pedal position region and increasing the gain when the pedal position is in a second pedal position region that is greater than the first pedal position region.

20. The vehicle of claim 10 wherein adjusting the control resolution includes setting a gain of powertrain output relative to pedal position in a first pedal position region and increasing the gain when the pedal position is in a second pedal position region that is greater than the first pedal position region.

* * * * *